(12) United States Patent
Wong et al.

(10) Patent No.: US 7,185,357 B1
(45) Date of Patent: Feb. 27, 2007

(54) METHOD AND MECHANISM FOR IMPLEMENTING SYNONYM-BASED ACCESS CONTROL

(75) Inventors: Daniel Man-Hung Wong, South San Franscisco, CA (US); Chon Hei Lei, Alameda, CA (US); Ahmed Alomari, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 852 days.

(21) Appl. No.: 10/144,668

(22) Filed: May 10, 2002

(51) Int. Cl.
*H04L 9/00* (2006.01)
*H04L 9/32* (2006.01)

(52) U.S. Cl. ............... 726/1; 726/2; 726/3; 726/27; 726/30

(58) Field of Classification Search ............. 726/1–6, 726/27–30; 707/1, 3, 9, 100
See application file for complete search history.

(56) References Cited

U.S. PATENT DOCUMENTS

| | | | |
|---|---|---|---|
| 6,718,535 B1 * | 4/2004 | Underwood | 717/101 |
| 6,766,314 B2 * | 7/2004 | Burnett | 707/2 |
| 6,820,082 B1 * | 11/2004 | Cook et al. | 707/9 |
| 6,907,546 B1 * | 6/2005 | Haswell et al. | 714/38 |

OTHER PUBLICATIONS

Bertino, E. et al. "Controlled Access and Dissemination of XML Documents" *Proceedings of the 2nd International Workshop on Web Information and Date Management*, Kansas City, MO (Nov. 1999) pp. 22-27.

Bertino, E. et al. "On Specifying Security Policies for Web Documents with an XML-based Language" *Proceedings of the 6th ACM Symposium on Access Control Models and Technologies*, Chantilly, VA (May 3-4, 2001) pp. 57-65.

Bonczek, R.H. et al. "A Transformational Grammar-Based Query Processor for Access Control in a Planning System" *ACM Transactions on Database Systems* (Dec. 1977) 2(4):326-338.

Castano, S. et al., "A New Approach to Security System Development" *Proceedings of the 1994 Workshop on New Security Paradigms* (Aug. 1994) pp. 82-88.

Gladney, H.M. "Access Control for Large Collections" *ACM Transactions on Information Systems* (Apr. 1977) 15(2):154-194.

Hsiao, D.K. "A Software Engineering Experience in the Management, Design and Implementation of a Data Secure System" *Proceedings of the 2nd International Conference on Software Engineering* (Oct. 1976) pp. 532-538.

Myers, A.C. and B. Liskov "Protecting Privacy Using the Decentralized Label Model" *ACM Transactions on Software Engineering and Methodology* (Oct. 2000) 9(4):410-442.

Sandhu, R.S. "The Schematic Protection Model: Its Definition and Analysis for Acyclic Attenuating Schemes" *Journal of the Association for Computing Machinery* (Apr. 1988) 35(2):404-432.

Sion, R. et al. "Rights Protection for Relational Data" *Proceedings of the 2003 ACM SIGMOD International Conference on Management of Data*, San Diego, CA (Jun 9-12, 2003) pp. 98-109.

Wedde, H.F. and M. Lischka "Role-Based Access Control in Ambient and Remote Space" *Proceedings of the 9th ACM Symposium on Access Control Models and Technologies*, Yorktown Heights, NY (Jun. 2-4, 2004) pp. 21-30.

* cited by examiner

*Primary Examiner*—Hosuk Song
(74) *Attorney, Agent, or Firm*—Bingham McCutchen LLP (57) ABSTRACT

A method and system for implementing access control in a computer system is disclosed. Synonyms associated with shareable security policies and policy functions are employed to encapsulate data from underlying data sources. By controlling access and contents of synonyms and their underlying security policies, fine-grained access control can be implemented for system data sources.

34 Claims, 6 Drawing Sheets

METHOD AND MECHANISM FOR IMPLEMENTING SYNONYM-BASED ACCESS CONTROL

BACKGROUND AND SUMMARY

The invention relates to computing systems, and more particularly to a method and mechanism for implementing fine-grained access control for data stored in a computer system. For many reasons, it is often desirable to limit the type and/or quantity of data that are made available to users of a computer system. For example, a very common reason for creating an access control policy is to enforce the security of data in the computer system.

In a database context, one approach for implementing access control is to utilize database views. A view is a custom presentation of data from one or more data sources. A view can be implemented as a stored query. A stored-query view does not normally contain or store data—it derives its data from the data sources upon which it is based by executing the stored query. In a relational database, the data source is referred to as a base table, which can itself be a view. A materialized view stores the results of the stored query into a separate schema object.

Figure 1:
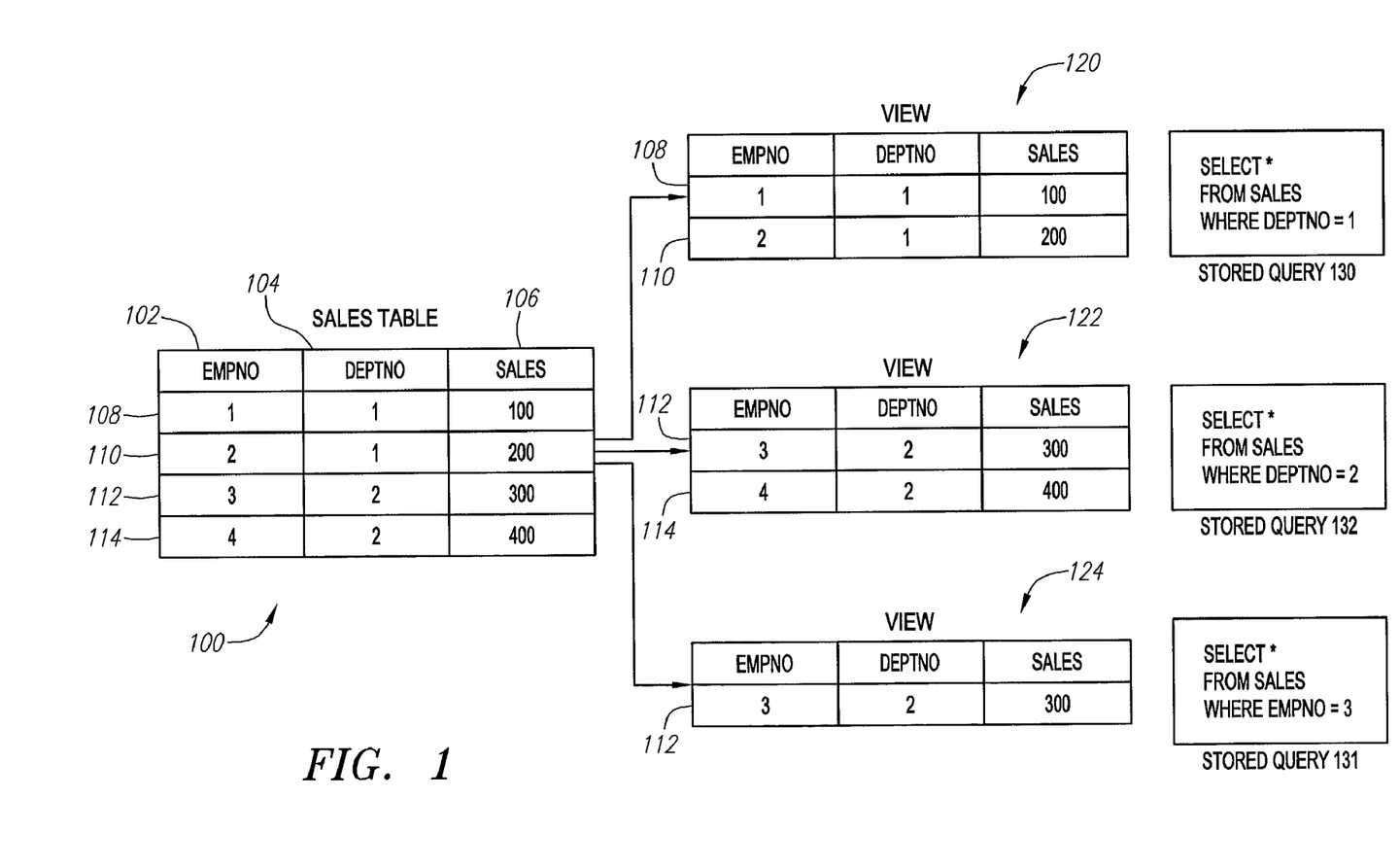
FIG. 1 illustrates access control using views.

A database view provides access control by restricting a user's access to a predetermined set of data from a data source. An example of this type of access control is shown in FIG. 1. FIG. 1 includes a database table (sales table 100) containing a set of sales data for a hypothetical company. Each entry in sales table 100 includes an employee number for a sales employee (in the empno column 102), a department number for that employee (in the deptno column 104), and a sales amount for that employee (in the sales column 106).

Consider if it is desired to restrict access to the data in sales table 100 such that each employee can only view data from his or her own department. Thus, employees from department number "1" can only access entries in sales table 100 in which the value in the deptno column 104 is "1" (i.e., entries 108 and 110). Similarly, employees from department number "2" can only access entries in sales table 100 in which the value in the deptno column 104 is "2" (i.e., entries 112 and 114).

This type of access control is implemented by creating a first view 120 for all entries in sales table 100 (the base table) having a value of "1" in the deptno column 104, e.g., by using stored query 130. A second view 122 is created for all entries in sales table 100 having a value of "2" in the deptno column 104, e.g., by using stored query 132. All employees from department number "1" would be given the appropriate authorizations to access view 120, while all employees from department number "2" would be given appropriate authorizations to access view 122. Employees from department number "1" are not allowed to access either the base sales table 100 or view 122. Employees from department number "2" are not allowed access to either the base sales table 100 or view 120. In this manner, data access for each user is limited to a subset of the underlying Sales Table 100, in which the subset is embodied as an accessible view.

In a similar manner, a view can be used to restrict a user's access to only his or her own data. Consider if it is desired to restrict the employee having employee number "3" to access only to entries in sales table 100 corresponding to that employee number (i.e., entry 112). This type of access control is implemented by creating view 124 for all entries in sales table 100 having a value of "3" in the empno column 102, e.g., by using stored query 134. The particular employee having an employee number "3" would be given the appropriate authorization to access view 124, but may be blocked from accessing the base sales table 100 or the other views 120 and 122.

Several drawbacks exist when using views to implement access control. For example, a large number of views may need to be created for each installation to enforce the intended access policies for that computer system. The overhead from maintaining a large number of views is significant—the server may need to maintain a large number of view objects and their dependencies in the system metadata. Moreover, when the definition of a view changes, dependent stored objects may need to be updated or recompiled. In addition, at runtime, a large amount of resources may need to be devoted to the corresponding metadata caches for the views.

The present invention is directed to an improved method and system for implementing access control in a computer system. In accordance with one embodiment of the invention, synonyms associated with shareable security policies and policy functions are employed to encapsulate data from underlying data sources. By controlling access and contents of synonyms and their underlying security policies, fine-grained access control can be implemented for system data sources. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to an improved method and system for implementing access control in a computer system. In accordance with one embodiment of the invention, shareable security policies and policy functions are employed to encapsulate data from underlying data sources. Synonyms provide users with unique and referential names for accessing an underlying policy or combinations of policies. By controlling access and contents of synonyms and their underlying security policies, fine-grained access control can be implemented for system data sources. The invention is illustratively described below with reference to relational database structures, but it is noted that the principles disclosed herein are equally applicable to other types of database or computing structures.

In an embodiment of the invention, security policies are implemented in conjunction with virtual private databases ("VPD"), in which the database stores information about groups of related users in different database schemas. Access is restricted in the database schema such that users may only access information pertinent to their associated group. This type of access restriction is implemented using security policies and policy functions. In this context, a security policy identifies a set of restrictions to data that limit a user or client to only data to which they are authorized to access. A policy function implements and applies the restrictions of a security policy to a given database query. For example, a policy function could modify a database query to include an additional predicate that limits access to only data allows by a user's associated security policy.

Figure 2:
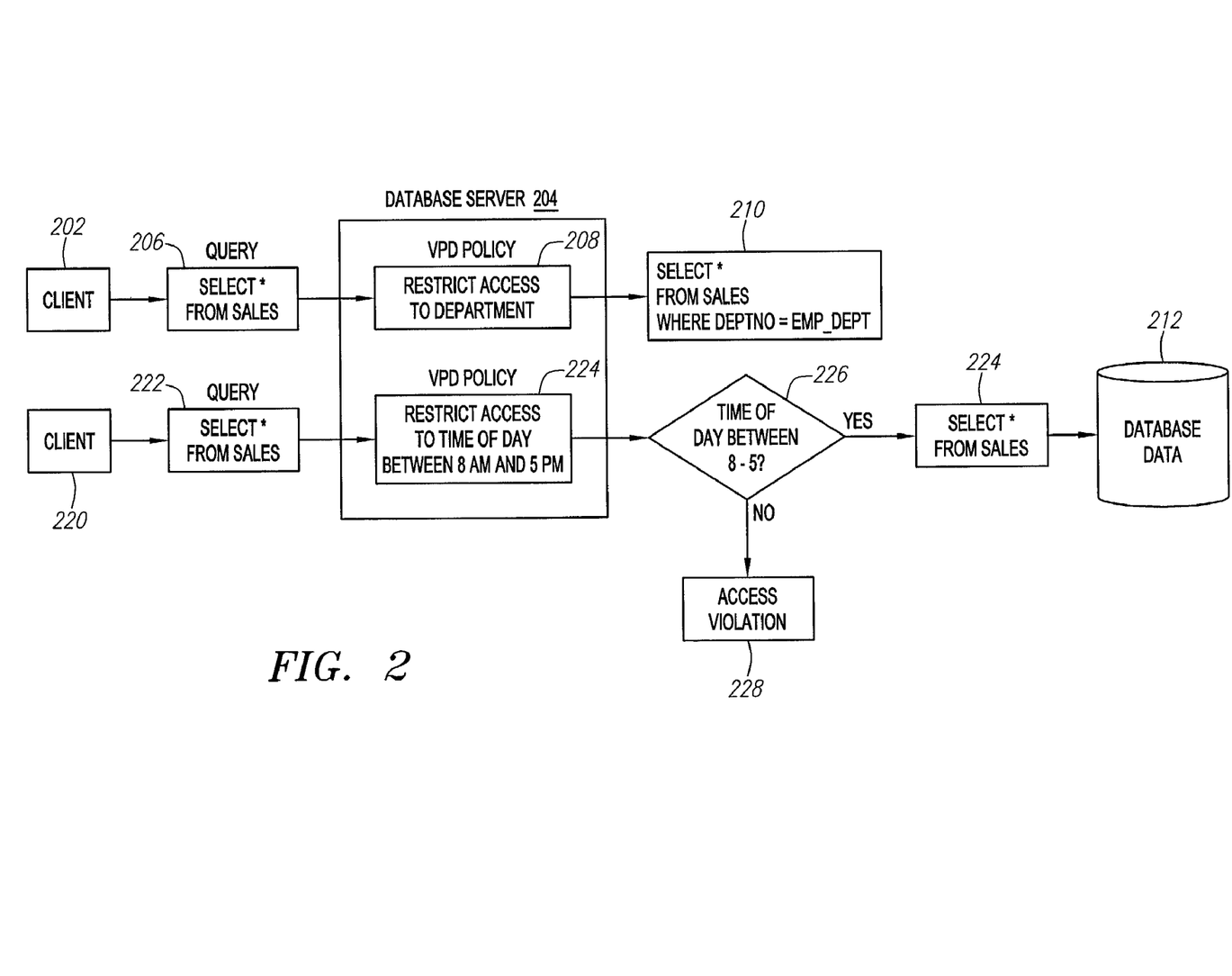
FIG. 2 illustrates security policies and policy functions according to an embodiment of the invention.

FIG. 2 illustrates an architecture for implementing VPDs using security policies and policy functions. Shown is a first client 202 that seeks to apply a query 206 to an underlying data source 212 through a database server 204. In particular, the query 206 seeks a fetch of all entries from the Sales Table, using the following SQL text:

SELECT *
FROM Sales;

A first example VPD security policy 208 is applicable which specifies that users are only permitted to access data from their own department number. To implement this security policy 208, a policy function would modify query 206 to include an additional predicate that performs the intent of the security policy. Thus, the following modification could be made to query 206 in this example to implement security policy 208:

SELECT*
FROM Sales
WHERE Deptno_column_value=employee_department;

The WHERE clause is the additional predicate that implements the intent of the security policy 208.

By only allowing such modified queries 210 to query the data source 212 for users subject to security policy 208, the database server 204 restricts or "filters" these users' access rights only to data from within their own department, which essentially creates a "private" database for those users regardless of the amount of other data that exists in data source 212.

FIG. 2 also shows another example security policy 224 that enforces a time-of-day restriction upon database access. In particular, example security policy 224 specifies that a user can access an underlying data source 212 only between the hours of 8 AM and 5 PM. A policy function can enforce this type of security policy by making a determination 226 of the time of day at which a user at client 220 is attempting to apply a query 222 at data source 212. If the policy function determines that the query is being applied during a permissible time period, then the query is allowed to proceed. If not, then an access violation 228 is identified and suitable action is taken (e.g., denying execution of the query).

Other and additional types of security policies and policy functions can be employed in embodiments of the invention. A system that uses VPDs is commercially available in the Oracle 9i database product available from Oracle Corporation of Redwood Shores, Calif. Additional information about implementing VPDs is described in U.S. patent application Ser. No. 09/167,092, filed on Oct. 5, 1998, and in U.S. patent application Ser. No. 09/812,896, filed on May 31, 2001, each of which are assigned to the assignee of the present application and each are hereby incorporated herein by reference in their entirety.

In one embodiment, a security policy can be shared by many objects, particularly when the intended data filtering predicates are identical or similar. This provides an advantage over the view approach for data filtering, since using shareable security policies will not require implementing an equal number of policy functions to replace dedicated views. Another advantage is that when it is desired to change a security policy, only its corresponding policy functions needs to be updated in an embodiment, which will only affect dependent cursors, but will not require recompilation of dependant persistent objects such as views or stored procedures. This essentially solves the data encapsulation problem with much lower cost.

A synonym or alias (hereinafter collectively referred to as synonyms) can be used to uniquely reference a set of one or more security policies upon a set of one or more data objects. The synonym thus provides a unique name that is called by or associated with one or more calling entities in the system. In this manner, the synonym provides an intermediate layer between the user and the underlying data objects. One or more security policies, which collectively specify the intended data filtering parameters, are associated with each synonym. Each synonym is thereafter made available to be accessed by the specific users that are to be associated with the data filtering objectives of that synonym. A public synonym is available to every user in the system. A private synonym is available to only a specific set of designated users associated with that synonym.

Figure 3:
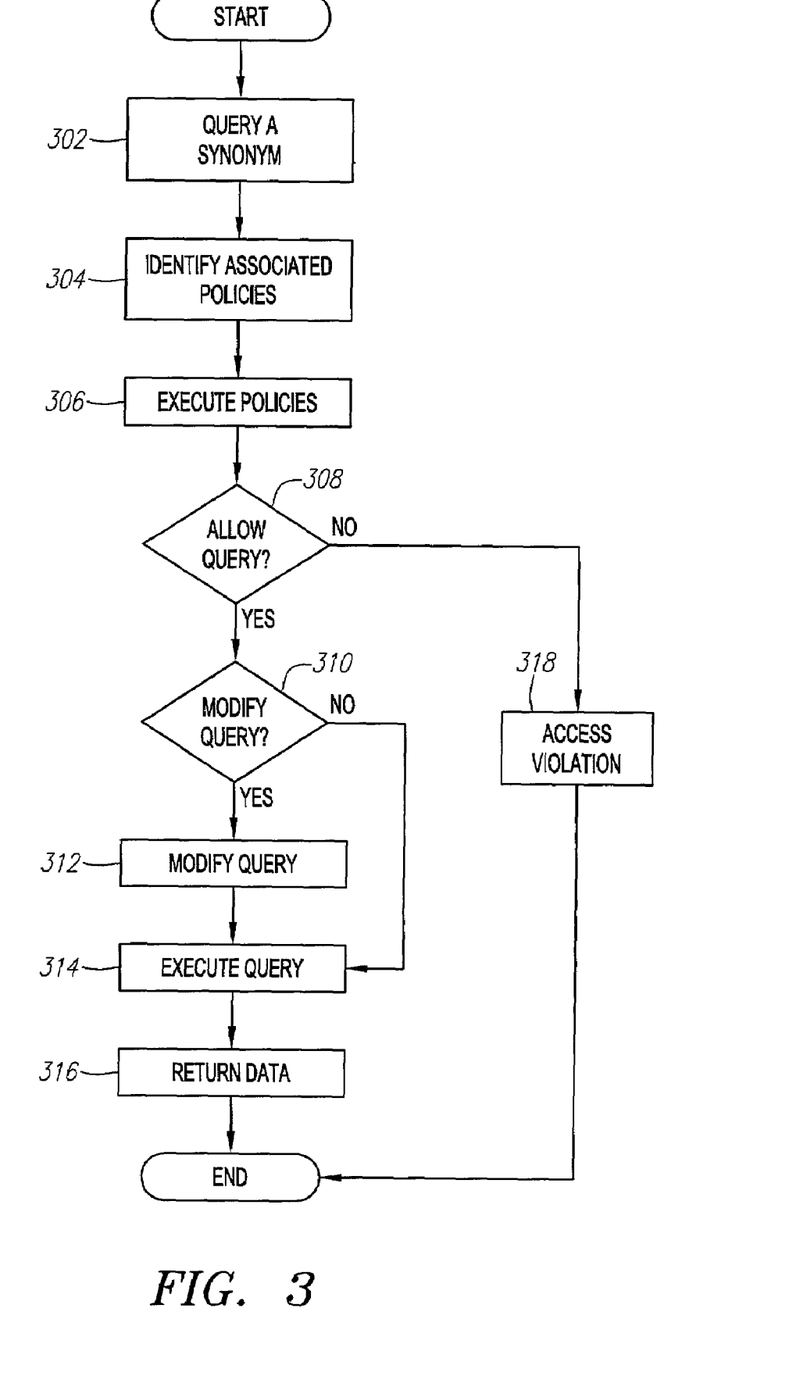
FIG. 3 is a flowchart of a process for implementing fine-grained access control according to an embodiment of the invention.

FIG. 3 shows a flowchart of a process for implementing fine-grained data access according to an embodiment of the invention. At step 302, a query is made against a synonym. At step 304, the security policies associated with that synonym are identified. At step 306, the identified security policies are executed, e.g., by using a policy function. The policy function determines whether to allow the query to execute (308). If the query cannot permissively be executed, e.g., because it violates a time-of-day restriction, then an access violation is identified and suitable action is taken (318).

The policy function may also identify whether the query should be modified to satisfy the intent of the security policy, e.g., by adding a predicate to enforce data filtering requirements of the security policy (310). If so, then the query is appropriately modified at step 312. The query, possibly modified at step 312, is thereafter executed (314) and the fetched data returned to the user (316).

Figure 4:
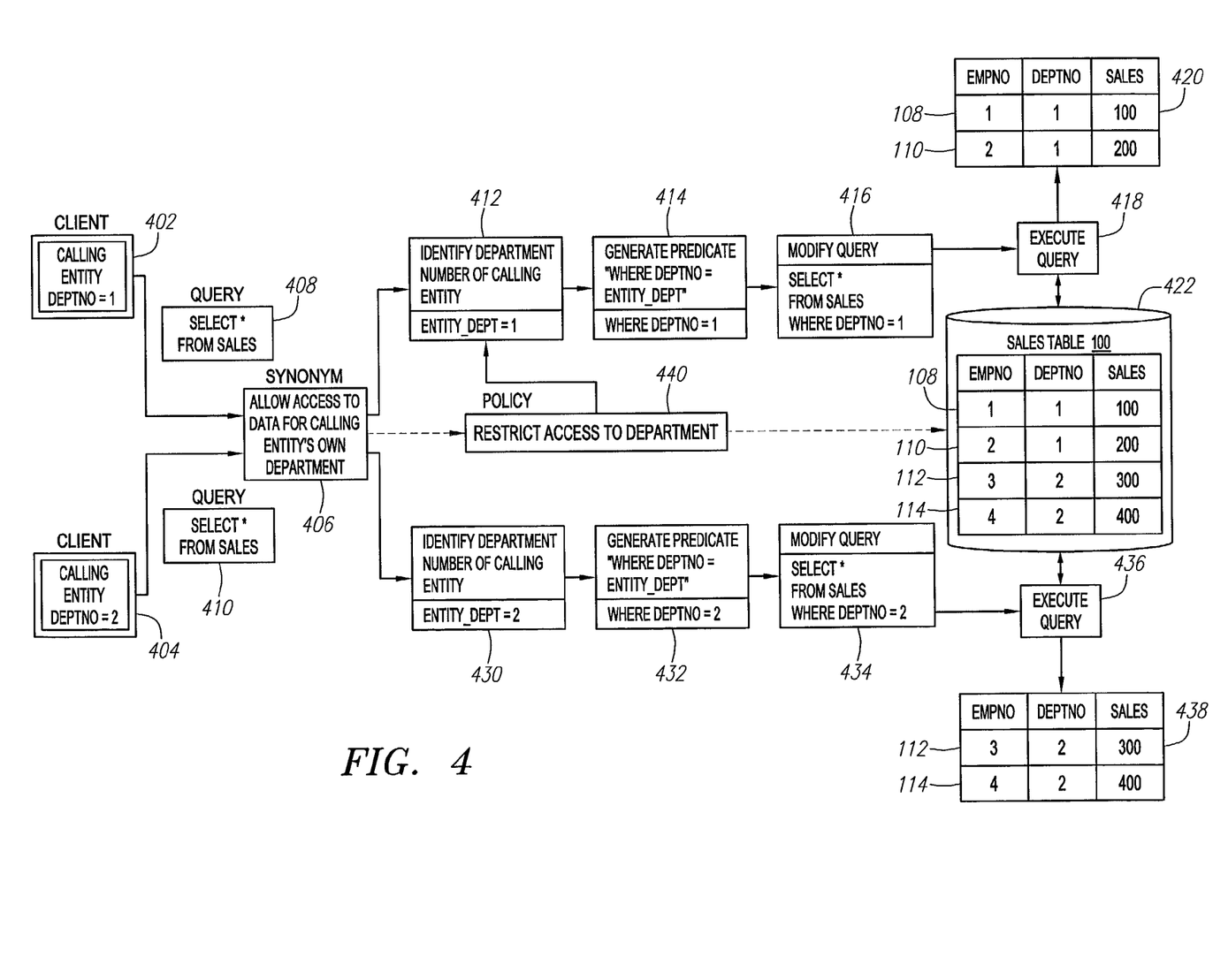
FIG. 4 illustratively shows synonym-based access control according to an embodiment of the invention.

FIG. 4 provides an illustrative example of the invention, in which the desired access policy to implement is to restrict a user's access to only data for that user's own department. Recall that this type of access policy using the view approach was shown in FIG. 1 and its corresponding text. Using the same base table 100 of FIG. 1, this type of access policy is illustrated using synonym based security policies.

In FIG. 4, a user in department number "1" at a first client 402 is seeking to fetch all entries from Sales Table 100. A synonym 406 exists that is associated with a security policy 440 that specifies data filtering parameters for Sales Table 100. In particular, security policy 440 specifies that a user is permitted to access only data from the user's own department from the underlying data object.

The query 408 from the user at client 402 is as follows:
SELECT *
FROM Sales;

This query 408 is applied to the synonym 406. To implement security policy 440, the query 408 will be modified with an additional predicate to implement the data filtering intent of the security policy. To make this modification, the policy function will first identify the department of the calling user, which is this case is department number "1"

(412). Based upon the user's department number, the additional predicate is thereafter generated as follows: "WHERE Deptno=1" (414). Therefore, the query 408 is modified to include the additional predicate as follows (416):

SELECT *
FROM Sales
WHERE Deptno=1;

The added predicate provides data filtering so that only data from the user's own department (department number "1") is fetched back to the user. Executing the modified query results in result set 420, which includes only rows 108 and 110 from Sales Table 100, which are the only rows from that data object having the value '1' in the Deptno column.

A similar process occurs for a user in department number "2" at a second client 404 that is also seeking to fetch all entries from Sales Table 100. The query 410 from client 404 is applied to the synonym 406. To implement security policy 440, the query 410 will be modified with an additional predicate to implement the data filtering intent of the security policy. To make this modification, the policy function will first identify the department of the calling user, which is this case is department number "2" (430). Based upon the user's department number, the additional predicate is thereafter generated as follows: "WHERE Deptno=2" (432). Therefore, the query 410 is modified to include the additional predicate as follows (434):

SELECT *
FROM Sales
WHERE Deptno=2;

The added predicate provides data filtering so that only data from the user's own department (department number "2") is fetched back to the user. Executing the modified query results in result set 438, which includes only rows 112 and 114 from Sales Table 100, which are the only rows from that data object having the value '2' in the Deptno column.

Figure 5:
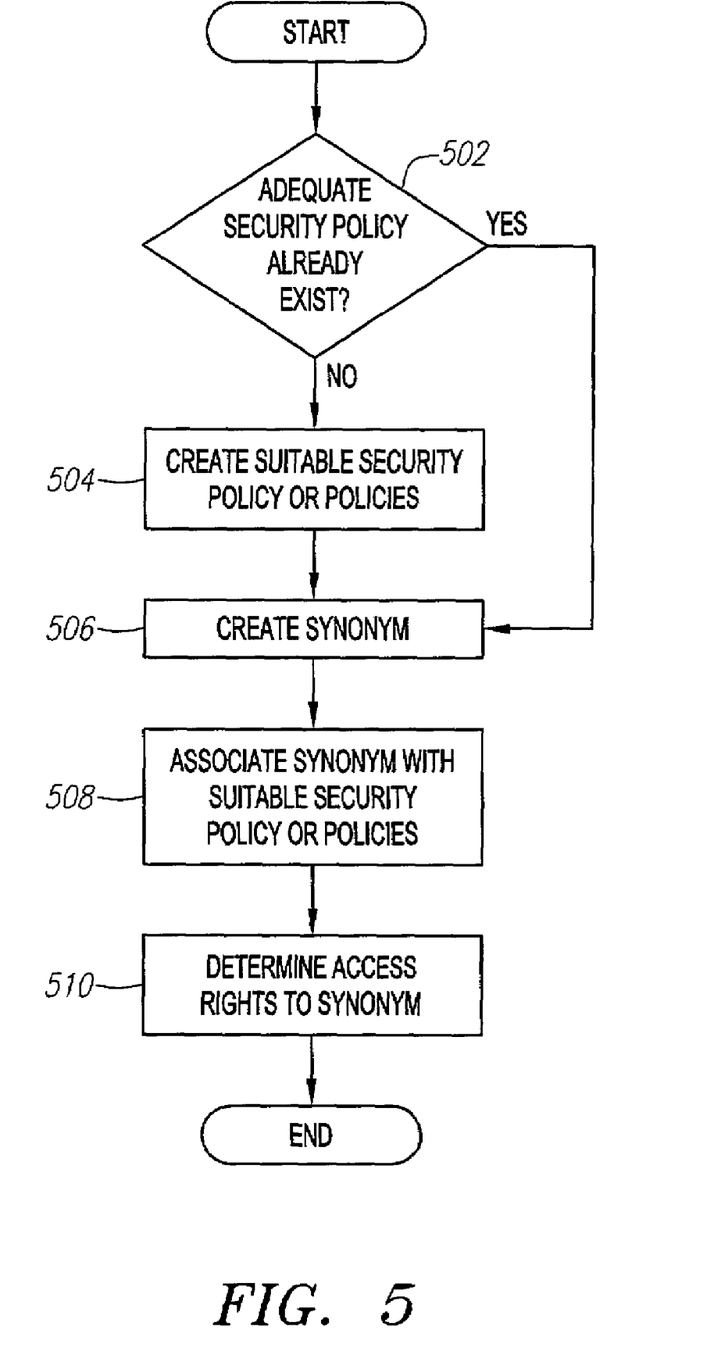
FIG. 5 is a flowchart of a process for creating synonym-based access control according to an embodiment of the invention.

FIG. 5 shows a flowchart for creating a synonym for implementing fine-grained access control in an embodiment of the invention. At step 502, a determination is made whether suitable security policies already exist which implement the data filtering intent of the desired access control. It is noted that in the preferred embodiment, security policies are shareable across multiple entities. If security policies are not shareable, the step 502 does not need to be performed. If suitable security policies do not already exist, then such policies are created at step 504.

At step 506, a suitably named synonym is created. The newly created synonym is associated with the one or more security policies previously identified or created (step 508). It is noted that depending upon the particular syntactical constructs used to create synonyms in the specific system to which the present invention is applied, it is possible that steps 506 and 508 are performed simultaneously. At step 510, the access rights for the newly created synonym is determined. If the new synonym is a public synonym, then all entities will have right of access by default. If the new synonym is a private synonym, then the creator of the new synonym can designate individuals or groups of entities that have right of access to the new synonym. In one embodiment, multiple levels of access rights may be established for the new synonym. At this point, the new synonym is available to be used by the system and users to enforce access control over data in the computing system.

SYSTEM ARCHITECTURE OVERVIEW

Figure 6:
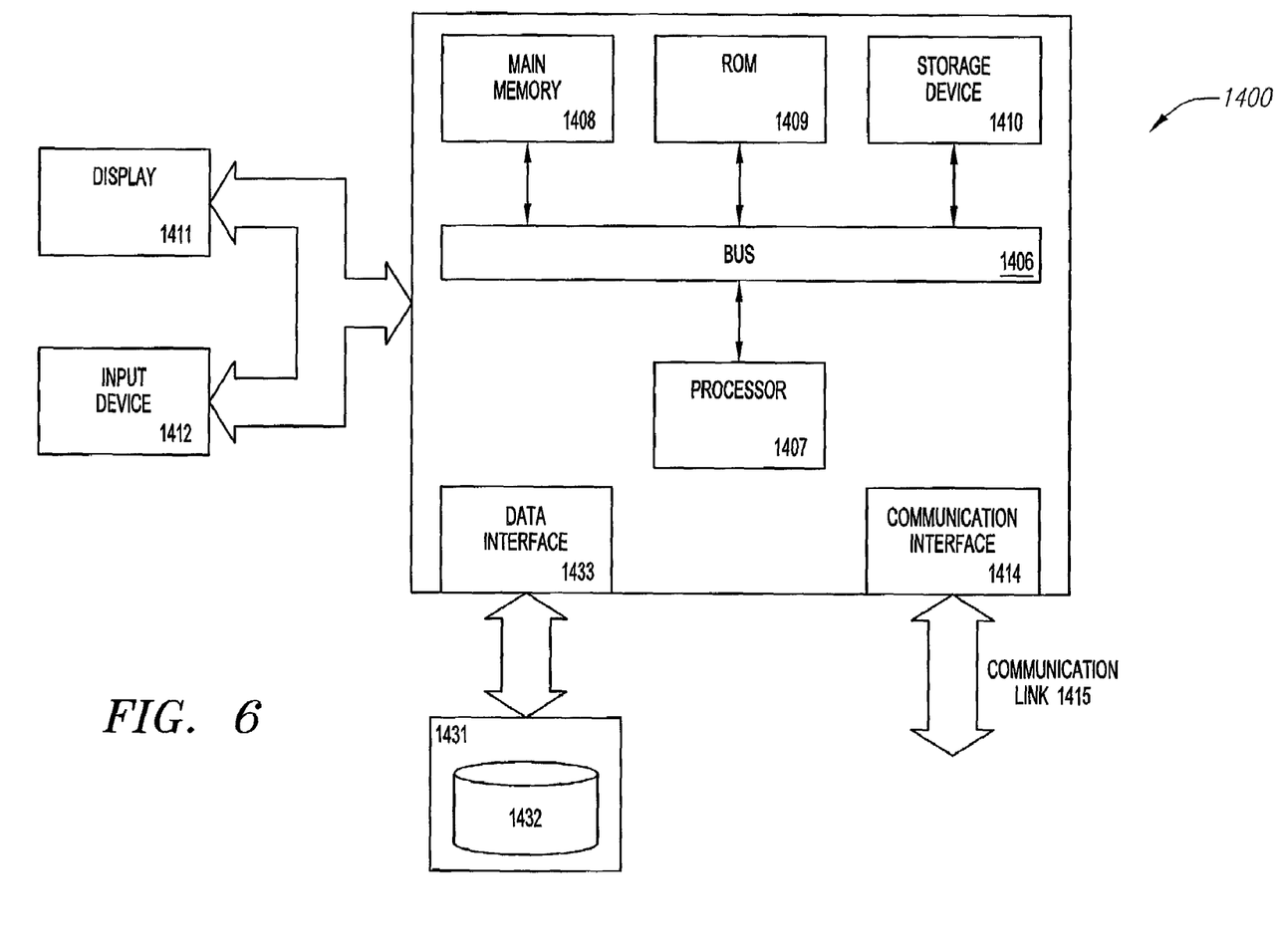
FIG. 6 is a diagram of a computer system architecture with which the present invention can be implemented.

The execution of the sequences of instructions required to practice the invention may be performed in embodiments of the invention by a computer system 1400 as shown in FIG. 6. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 6, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A computer-implemented method for implementing access control to data in a computing system, comprising:
   receiving a data query;
   associating the data query with a named object, the named object associated with one or more security policies, each of the one or more security policies specifying data access parameters;
   applying the one or more security policies associated with said named object to the data query by modifying the data query to include one or more new predicates; and
   restricting access to data for the data query based upon the one or more security policies.

2. The method of claim 1, in which the one or more new predicates comprise a WHERE clause that implements a data filtering intent for selected ones of the one or more security policies associated with said named object.

3. The method of claim 1 in which one or more policy functions perform the act of applying only the one or more security policies associated with said named object to the data query.

4. The method of claim 1, in which the act of restricting access prevents execution of the data query.

5. The method of claim 1, in which the one or more security policies comprise VPD security policies.

6. The method of claim 1, in which a least one of the one or more security policies is a shareable security policy by a plurality of objects.

7. The method of claim 1, in which the named object comprises a synonym.

8. The method of claim 7, in which the synonym is either a public synonym or a private synonym.

9. A system for implementing access control to data in a computing system, comprising:
   one or more security policies specifying data access parameters;
   a named object associated with the one or more security policies; and
   one or more corresponding policy functions to implement the one or more security policies associated with said named object against a data query by modifying the data query to include one or more new predicates, the data query being associated with the named object.

10. The system of claim 9, in which the named object comprises a synonym.

11. The system of claim 10, in which the synonym is either a public synonym or a private synonym.

12. The system of claim 9, in which the one or more new predicates comprise a WHERE clause that implements a data filtering intent for selected ones of the one or more security policies associated with said named object.

13. The system of claim 9, in which the one or more policy functions implements the one or more security policies by preventing execution of the data query.

14. The system of claim 9, in which a least one of the one or more security policies is a shareable security policy.

15. A computer-implemented method of creating a synonym for synonym-based access control, comprising:
   identifying whether one or more suitable security policies that match the data filtering intent of intended access control exist;
   creating the one or more suitable security policies if said one or more suitable security policies do not already exist;
   creating a synonym as a named data object to implement the data filtering intent of the intended access control; and
   associating the one or more suitable security policies with the synonym.

16. The method of claim 15, in which the synonym is a uniquely named object.

17. The method of claim 15, further comprising the act of determining access rights to the synonym.

18. The method of claim 15, further comprising the act of making the synonym available to be accessed by users.

19. A computer program product comprising a computer usable storage medium having executable code to execute a method for implementing access control to data in a computing system, the method comprising the steps of:
  receiving a data query;
  associating the data query with a named object, the named object associated with one or more security policies, each of the one or more security policies specifying data access parameters;
  applying the one or more security policies associated with said named object to the data query by modifying the data query to include one or more new predicates; and
  restricting access to data for the data query based upon the one or more security policies.

20. The computer program product of claim 19, in which the one or more new predicates comprise a WHERE clause that implements a data filtering intent for selected ones of the one or more security policies associated with said named object.

21. The computer program product of claim 19, in which one or more policy functions perform an act of applying the one or more security policies associated with said named object to the data query.

22. The computer program product of claim 19, in which the act of restricting access prevents execution of the data query.

23. The computer program product of claim 19, in which the one or more security policies comprise VPD security policies.

24. The computer program product of claim 19, in which a least one of the one or more security policies is a shareable security policy by many objects.

25. The computer program product of claim 19, in which the named object comprises a synonym.

26. The computer program product of claim 25, in which the synonym is either a public synonym or a private synonym.

27. A system of creating a synonym for synonym-based access control, comprising:
  means for identifying whether one or more suitable security policies that match the data filtering intent of intended access control exist;
  means for creating the one or more suitable security policies if said one or more suitable security policies do not already exist;
  means for creating a synonym as a named data object to implement the data filtering intent of the intended access control; and
  means for associating the one or more suitable security policies with the synonym.

28. The system of claim 27, in which the synonym is a uniquely named object.

29. The system of claim 27, further comprising means for determining access rights to the synonym.

30. The system of claim 27 further comprising means for making the synonym available to be accessed by users.

31. A computer program product comprising a computer usable storage medium having executable code to execute a method for creating a synonym for synonym-based access control, comprising the steps of:
  identifying whether one or more suitable security policies that match the data filtering intent of intended access control exist;
  creating the one or more suitable security policies if said one or more suitable security policies do not already exist;
  creating a synonym as a named data object to implement the data filtering intent of the intended access control; and
  associating the one or more suitable security policies with the synonym.

32. The computer program product of claim 31, in which the synonym is a uniquely named object.

33. The computer program product of claim 31, further comprising the step of determining access rights to the synonym.

34. The computer program product of claim 31, further comprising the step of making the synonym available to be accessed by users.

* * * * *